United States Patent
Takagi et al.

[11] Patent Number: 5,136,503
[45] Date of Patent: Aug. 4, 1992

[54] MACHINE TRANSLATION SYSTEM

[75] Inventors: Akira Takagi, Tokyo; Jun Takada, Tama; Minoru Yukawa, Sagamihara, all of Japan

[73] Assignee: Kabushiki Kaisha CSK, Tokyo, Japan

[21] Appl. No.: 452,807

[22] Filed: Dec. 19, 1989

[30] Foreign Application Priority Data

Dec. 20, 1988 [JP] Japan .......................... 63-321602

[51] Int. Cl.[5] ........................................... G06F 15/38
[52] U.S. Cl. ................................................. 364/419
[58] Field of Search ............... 364/419, 900 MS File

[56] References Cited

U.S. PATENT DOCUMENTS

| | | | |
|---|---|---|---|
| 4,821,230 | 4/1989 | Kumano et al. | 364/419 |
| 4,833,611 | 5/1989 | Fukumochi et al. | 364/419 |
| 4,954,984 | 9/1990 | Kaijima et al. | 364/419 |
| 4,964,044 | 10/1990 | Kumano et al. | 364/900 |

Primary Examiner—Dale M. Shaw
Assistant Examiner—Xuong Chung
Attorney, Agent, or Firm—Lackenbach Siegel Marzullo & Aronson

[57] ABSTRACT

A machine translation system for automatically effecting translation from Japanese the source language into another or target language. Conventional translation systems entail problems, e.g., the reduction in processing efficiency owing to the need for an additional step such as pre-editing prior to translation. In the machine translation system of the present invention, the main process step for mechanical translation, the syntactic analysis step, is based on the determination of whether or not any modification relationship can be established for each pair of adjacent words by extracting a rule corresponding to that combination from a part of speech matrix table in which analysis rules of the source language are described with respect to the parts of speech of the corresponding pair of words to modifying words and head words; successively stacking each of these word combinations for which a modification relationship has been established for use as a analysis tree element; and displaying an analysis tree corresponding to the original sentence in the source language from the stacked analysis tree segments. The number of syntactic rules is thereby limited to the square of the number of individual parts of speech, the need for pre-editing is eliminated and Japanese sentences in every style can be translated with improved efficiency.

6 Claims, 5 Drawing Sheets

Fig. 3

JAPANESE DICTIONARY SECTION

"kau (BUY)"
  (1) PART OF SPEECH    : VERB
  (2) SEMANTIC FEATURE : ACTION
  (3) CASE SLOTS CASE-WORD     SEMEME
    ① NOMINATIVE CASE : "wa.ga" - PERSO. LEGAL PERSON
    ② OBJECTIVE CASE  : "o" - GOODS "watashi (I)"
  (1) PART OF SPEECH    : PRONOUN
  (2) SEMANTIC FEATURE : PERSON

|  | PRONOUN | NOUN | CASE-WORD | VERB |
|---|---|---|---|---|
| PRONOUN |  |  | A |  |
| NOUN |  |  |  |  |
| CASE-WORD |  | C |  | B |
| VERB |  |  |  |  |

HEAD →
MODIFIER ↓
~21

MACHINE TRANSLATION SYSTEM

BACKGROUND OF THE INVENTION

This invention relates to a machine translation system for automatic translation of the Japanese language into a certain other language.

With recent developments in computers and communication technology, international information exchanges have become fast and voluminous. Because various economic activities are performed worldwide these days, the significance of international communication is therefore increasing.

Under these circumstances, the development of systems for automatically effecting translation between Japanese and English with computers is desirable, and various machine translation systems have been developed.

Conventionally, the development of transfer systems in which the compositions of original sentences are analyzed on the basis of a context-free grammar, a context-senitive grammar or the like is the mainstream approach to machine translation from Japanese into English.

Ordinarily, in conventional machine translation systems, the syntax of the source sentence is analyzed based on a context-free grammar and case relationships, as previously mentioned. In this process, however, syntactic writing analysis rules are required for each of the different writing styles, and different rules are required even for sentences having the same meaning but different word orders. The number of necessary syntactic analysis rules is therefore innumerably large.

In practice, it is impossible to provide innumerable syntactic analysis rules for all possible styles. For this reason, in actual translation processes, syntactic analysis or the like is performed after the original sentences have been transformed by pre-editing. Thus, the conventional systems necessitate laborious operations including pre-editing before translation and are therefore disadvantageous in terms of efficiency.

SUMMARY OF THE INVENTION

The present invention has been designed in consideration of these problems, and the object of the present invention is to provide a machine translation system capable of efficiently translating Japanese sentences in any style without the necessity of the pre-editing process, as required for conventional systems.

To achieve this object while exploiting the present invention, there is provided a machine translation system having: a morpheme analysis step which segments an original input sentence into words and annexes the grammatical and semantic information designated by each of these words to that word; a syntactic analysis step which forms an analysis tree of the original sentence by analyzing the modification relationships between the words obtained by the morpheme analysis step on the basis of the previously identified grammatical and semantic information and analysis rules; a syntactic conversion step which convent, the analysis tree obtained from the syntactic analysis step into another analysis tree which allows a sentence to be formed in the target language into which the original sentence is to be translated; a sentence generation step forms a proto-translated sentence on the basis of generative rules; and a morpheme synthesis step which inflects each of the words of the formed proto-translation sentence on the basis of additional information; the machine translation system being characterized in that the syntactic analysis step includes the steps of: determining whether of not any modification relationship (modifier-head relationship) is established in each pair of words by extracting a rule corresponding to that combination from a part of speech matrix table which describes analysis rules in terms of the combinations of the various parts of speech corresponding to modifying and modified words; successively stacking each of these combinations of words to be used as an analysis tree segment and a modification relationship is to be established; and displaying an analysis tree corresponding to the original sentence from the stacked analysis tree segments.

In result of the present invention, the number of rules for syntactic analysis is at most the square of the number of individual parts of speech, the need for pre-editing is eliminated, and Japanese sentences in every writing style can therefore be translated with improved efficiency.

BRIEF DESCRIPTION OF THE DRAWINGS

FIG. 3 is an example of the contents of two entries in the Japanese dictionary section;

FIG. 4 is a diagram of contents of a part of speech matrix table;

DESCRIPTION OF A TYPICAL IMPLEMENTATION

An implementation of the present invention will be described below in detail with reference to the accompanying figures.

Figure 1:
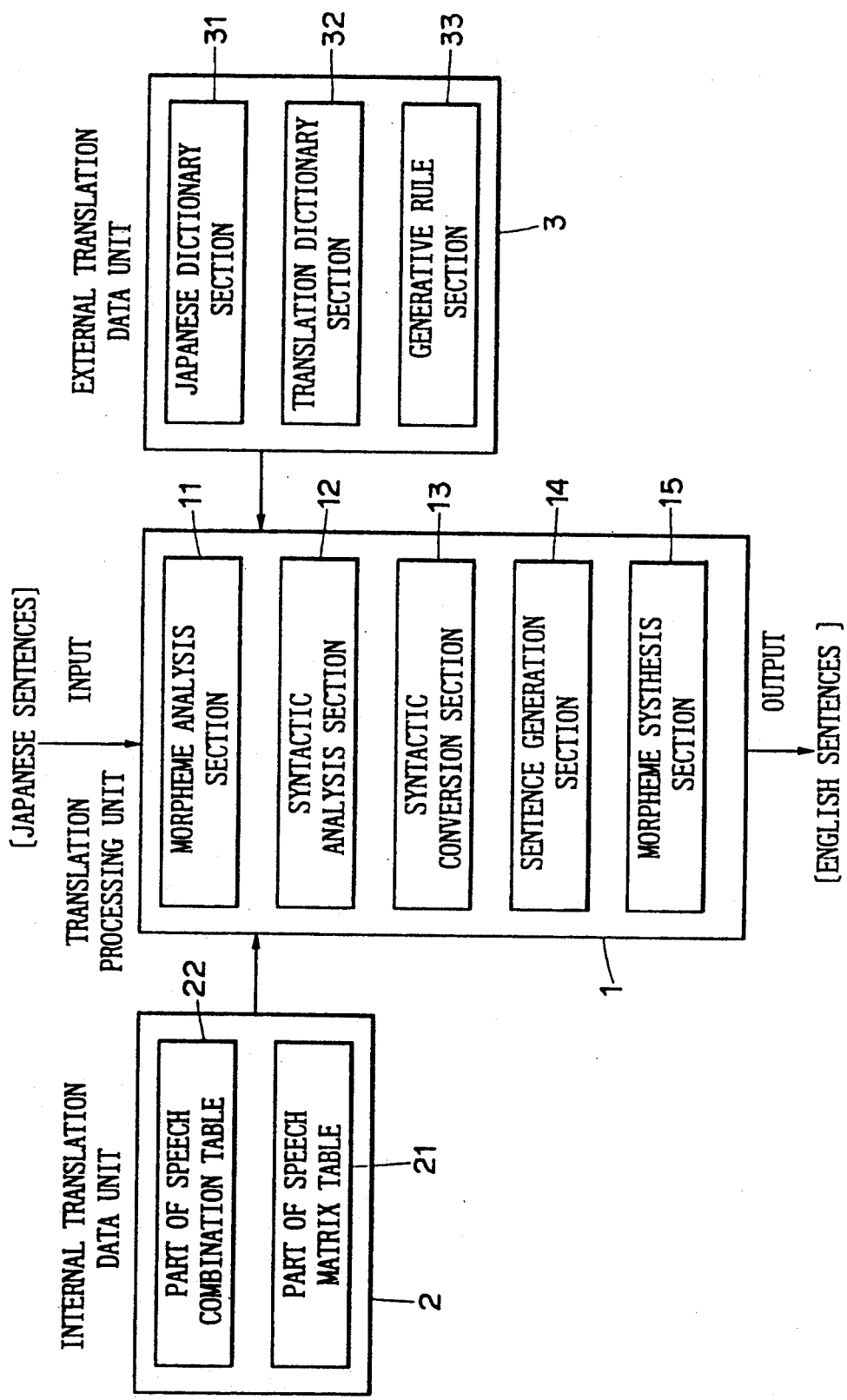
FIG. 1 is a functional block diagram of a machine translation system implemented with the present invention.

FIG. 1 is a functional block diagram of a machine translation system utilizing the present invention.

This machine translation system has a translation processing unit 1, an internal data unit 2 containing internal translation data, and an external data unit 3 containing external translation data. The internal data unit 2 has a part of speech matrix table 21 and a part of speech interconnection table 22, and the external data unit 3 has a Japanese dictionary section 31, a translation dictionary section 32 and a generative rule section 33.

The translation processing unit 1 consists of a morpheme analysis section 11, a grammatical construction analysis section 12, a grammatical construction conversion section 13, a sentence generation section 14 and a morpheme synthesis section 15.

Figure 2:
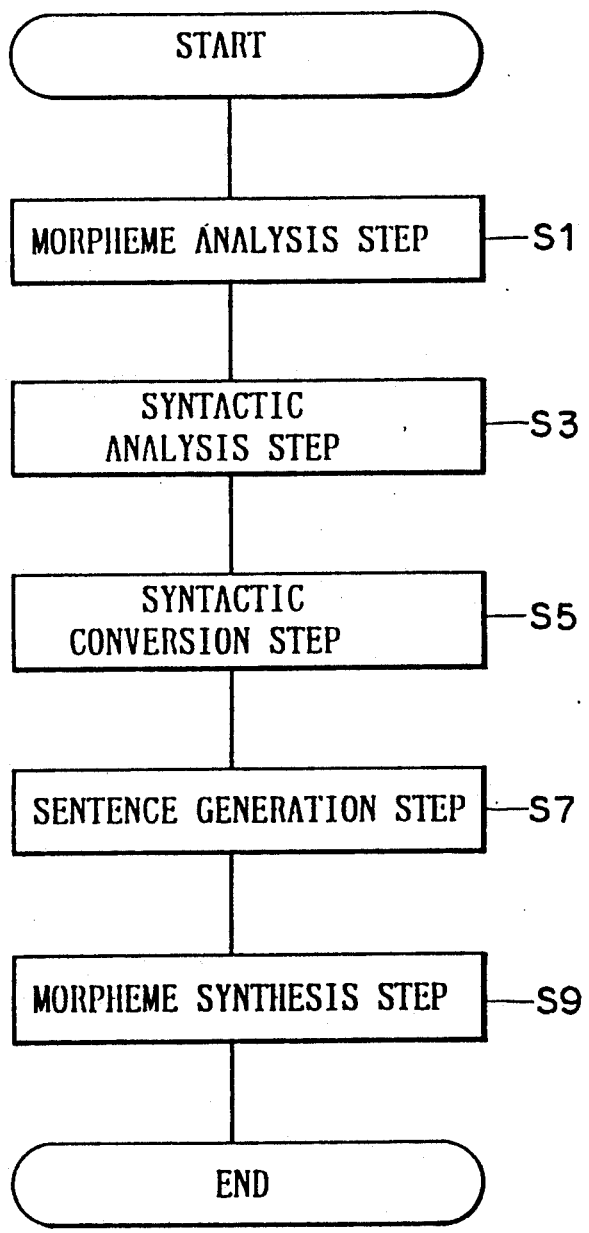
FIG. 2 is a flow chart of a translation process of the machine translation system of the present invention.

As shown in the flow chart in FIG. 2, the morpheme analysis section 11 effects a morpheme analysis step S1 in which Japanese input sentence is segmented into words and grammatical and semantic information associated with the words is annexed to the words. The grammatical construction analysis section 12 effects a grammatical construction analysis step S3 in which an analysis tree of the Japanese sentence is formed by analyzing modification (modifier-head relationships) between the words obtained by the morpheme analysis step S1 on the basis of the above-mentioned grammatical and semantic information and analysis rules. The syntactic conversion section 13 effects a syntactic conversion step S5 in which the structure of the Japanese sentence is converted into the structure of the corresponding English sentence on the basis of the results of the syntactic analysis. The sentence generation section 14 effects a sentence generation step S7 in which the corresponding English sentence is formed on the basis of rules for the generation of English sentences. The morpheme synthesis section 15 effects a morpheme synthesis step S9 in which each of the words of the English proto-sentence is inflected on the basis of additional information. Japanese sentences are translated into English sentences by this process.

The following will explain this translation process in more detail with respect to examples thereof.

When the Japanese sentence "Watashi wa, Shinjuku de Hon o Katta. (I bought a book in Shinjuku.)" is translated into English, the morpheme analysis section 11 first divides the original sentence into words in the morpheme analysis step S1 as follows.

Watashi/wa/Shinjuku/de/hon/o/kat/ta.

If "Watashiwa" were analyzed as one word, further analysis is made by consulting the part of speech linkage table 22 of the internal data unit 2 and to the Japanese dictionary 31 of the external data unit 3 with a form such as that shown in FIG. 3 to determine whether or not the word "Watashiwa" is an inflected form. In this case, "Watashiwa" is not an inflected form and morpheme analysis therefore further divides "Watashiwa" into "Watashi" and "wa".

Information on whether or not respective morphemes may be linked is stored in the part of speech linkage table of this system. Grammatical and semantic information on the part of speech, the semantic features, cases and so on of each word is recorded in the Japanese dictionary section 31, as shown in FIG. 3. Grammatical and semantic information associated with each indentified word obtained from the Japanese dictionary section 31 is annexed to the word and is supplied for the next syntactic analysis step S3.

In the syntactic analysis step S3 effected by the syntactic analysis section 12, the identified words are first successively taken two at a time and examined for modification evaluation. Modification evaluation is effected on the basis of the part of speech matrix table 21 of the internal data unit 2 in which analysis rules are described in accordance with the parts of speech of the combinations of modifying and head words. That is, a rule for the combination of the parts of speech of the two extracted words is extracted from the part of speech matrix table 21 to determine whether or not any modification relationship is to be established. The number of rules described in the part of speech matrix table 21 corresponds, at its maximum, to the square of the number of individual parts of speech. The parts of words are successively selected from the head of the sentence because in Japanese there is, as a general rule, no possibility of a word in a position later in a sentence modifying a word in a prior position.

In the case of the above example, "Watashi" (pronoun) and "wa" (kaku(case)-joshi(a postpositional word functioning as an auxiliary to the main word) (hereinafter referred to as a "case-word")) are successively extracted from the head of the sentence, and the part of speech matrix table 21 having a construction such as that shown in FIG. 4 is read. In this case, the pronoun "Watashi" is a modifying word while the case-word "wa" is a modified word, and rule A is read from the corresponding cell in the part of speech matrix table 21. For example, rule A states that "the pronoun modifies the case-word" and thereby determines that a modification relationship is to be established. Then, "wa" and "Shinjuku" (noun) are extracted and a rule C is obtained by reading the part of speech matrix table 21. In this case, rule C states that "There is no modification relationship", and this combination of words is ignored.

Figure 5A:
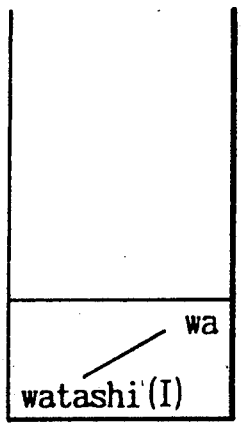
FIGS. 5(a), 5(b), and 5(c) are diagrams of analysis tree parts stored in stacks.
Figure 5B:
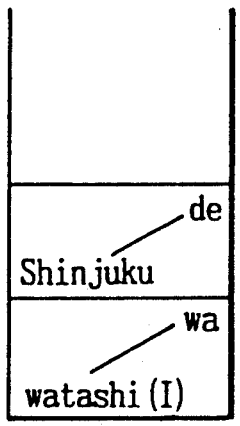
Figure 5C:
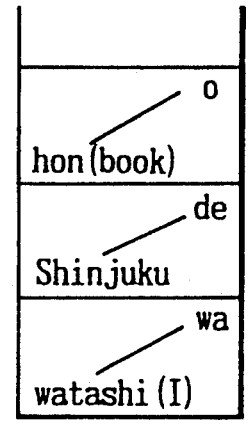

Next, in the syntactic analysis step S3, pairs of words between which modification relationships have been established are successively stored in a stack 5. For example, because a modification relationship has been established between "Watashi" and "wa", an analysis tree segment is formed and placed in stack 5, as shown in FIG. 5(a). Stack 5 is of a last-in first-out type. In a similar manner, modification relationships are established for the combination of "Shinjuku" and "de" (case-word) and the combination of "hon" (noun) and "o" (case-word), and analysis tree segments formed from these pairs of words are successively placed in stack 5, as shown in FIGS. 5(b) and 5(c).

Two words, "o" (case-word) and "kau" (verb) are extracted and the part of speech matrix table 21 is read. The corresponding rule B state, for example, that "a modification relationship is to be established provided that a match occurs between case-words and sememes in the case slots of the verb and the modifying case-word and the noun subordinate to the case-word". In this example, the case-word and the sememe in the corresponding case slot of "kau" are "o" and "goods", respectively, while the modifying case-word is "o" and the sememe of the subordinate noun "hon" is "goods", which satisfies the above rule. As a result, a modification relationship is established between "o" and "kau", and the corresponding analysis tree segment is stored in stack 5.

Figure 6A:
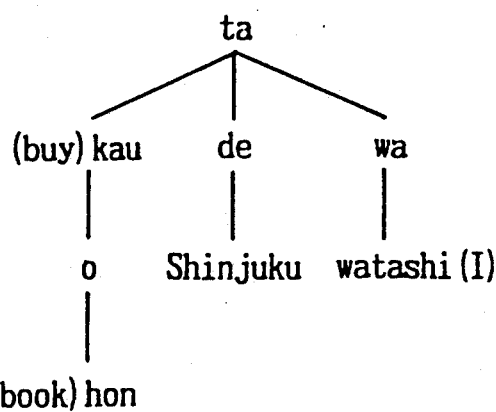
FIG. 6(a) is a diagram of an analysis tree generated by syntactic analysis.

At the last stage of the syntactic analysis step S3, an analysis tree, such as that shown in FIG. 6(a), corresponding to the original Japanese sentence is formed from the analysis tree segments stored in stack 5 and is then stored.

Figure 6B:
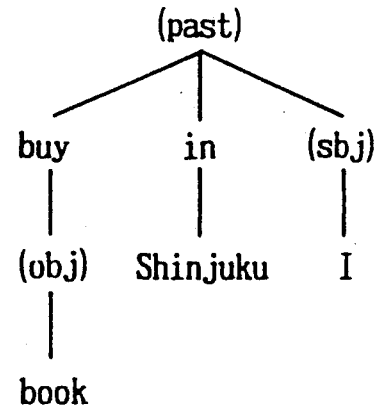
FIG. 6(b) is a diagram of an analysis tree generated by syntactic conversion.

In the syntactic conversion step S5 effected by the syntactic conversion section 13, the analysis tree produced by the syntactic analysis section 12 is converted into an analysis tree having a structure compatable with English. At this time, Japanese words are replaced with English words. This replacement is effected with reference to the translation dictionary section 32 of the external data unit 3. The analysis tree produced by the syntactic conversion step S5 is as shown in FIG. 6(b).

In the sentence generation step S7 effected by the sentence generation section 14, the analysis tree from which the corresponding English sentence is to be formed is rearranged in a one-dimensional row, and a proto-English sentence (I buy book in Shinjuku) is formed using the generative rule section 33 of the external data unit 3.

In the morpheme synthesis step S9 effected by the morpheme synthesis section 15, each of the generated English words is inflected on the basis of the inflectional information such as the past participle forms of verbs, plural forms of nouns, and so on, thereby generating the final translation (I bought a book in Shinjuku).

The above description explains the translation of a Japanese sentence into English. However, it is to be construed that the language into which Japanese sentences may be translated is not limited to English and that the present invention can be applied to translation into any other language, e.g., French and Russian.

What is claimed is:

1. A method of translating sentences in a source language into a target language by use of a machine translation system comprising:

a morpheme analysis step in which an input source sentence is segmented into words and grammatical and semantic information associated with each of the words is annexed to the same word;

a syntactic analysis step in which an analysis tree of the source language sentence is formed by analyzing modification relationships between the words identified by the morpheme analysis step on the basis of the grammatical and semantic information and analysis rules of the source language;

a syntactic conversion step in which the analysis tree obtained by the syntactic analysis step is converted into another analysis tree from which a sentence can be formed in the target language;

a sentence generation step in which a translated proto-sentence is formed on the basis of generative rules; and a sentence generation step in which a translated proto-translation sentence is inflected of the basis of additional information; said machine translation system being characterized in that the syntactic analysis step includes the steps of: the determination whether or not any modification relationship is to be established for each of pairs of the words by extracting a rule corresponding to that combination of parts of speech from a part of speech matrix table in which analysis rules of the source language are described for various combinations of parts of speech, of word modification and head words; successively stacking each of word combinations as segments of the analysis tree for word modification relationships established; and displaying an analysis tree corresponding to the source language sentence from the stacked analysis tree segments.

2. A method of translating sentences in a source language into a target language by use of a machine translation system according to claim 1, wherein a stored part of speech interconnection table in which linkage information concerning whether or not linkage between words is possible is provided and a dictionary in which grammatical and semantic information to be annexed to words is provided, and wherein the morpheme analysis step determination of the existence of any inflection on each morpheme is effected by referring to said part of speech linkage table and said dictionary.

3. A method of translating sentences in a source language into a target language by use of a machine translation system according to claim 1, in which in the grammatical analysis step the words identified by the morpheme analysis step are extracted two at a time to be examined in order to determine any modification relationship.

4. A machine translation system for translating a source language into a target language having, a translation processing unit having a plurality of sections comprising, means for inputting a sentence in words of the source language to be translated into the target language, a morpheme analysis section for effecting a morpheme analysis of the inputted sentence having means for receiving the inputted sentence and effecting morpheme analysis thereof and having means for segmenting the sentence into words and identifying grammatical and semantic information associated with each identified word, means for annexing to each word semantic information associated with the same word for syntactic analysis a syntactic analysis section having means for effecting a syntactic analysis of the inputted sentence by forming an analysis tree of said morpheme analysis of the inputted sentence by examining the identified words for modification evaluation on the basis of any modification relationship with another word in accordance with rules of the source language for combination of parts of speech and the modifying of a word by another word in the source language, a syntactic conversion section having means for converting the analysis tree produced by the syntactic analysis section into another analysis tree having a structure compatible with the target language and replacing the words of the source language with the target language with reference to translation data, of the target language, a sentence generation section having means for rearranging the analysis tree compatible with the target language into a one-dimensional row and forming a proto-target language sentence using generative rules, and a translation data unit connected to said translation processing unit having means for providing said translation data and means for providing said generative rules.

5. A machine translation system for translating a source language to a target language according to claim 4, including an internal translation unit connected to said translation processing unit having means for providing data on combination of parts of speech and modification relationships between words of the source language required by said syntactic analysis section.

6. A machine translation system according to claim 5, including means for identifying words two at a time to determine any modification relationships.

* * * * *